June 2, 1931. M. D. SWORDS 1,807,807
APPARATUS FOR DISCHARGING SALT CAKE FROM MANNHEIM FURNACES
Filed Jan. 27, 1928
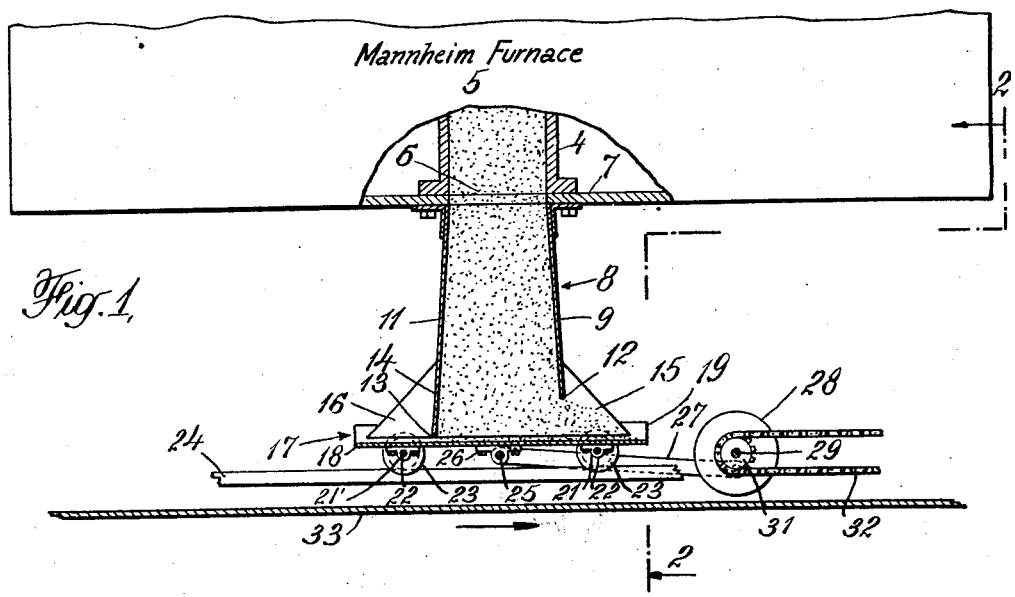
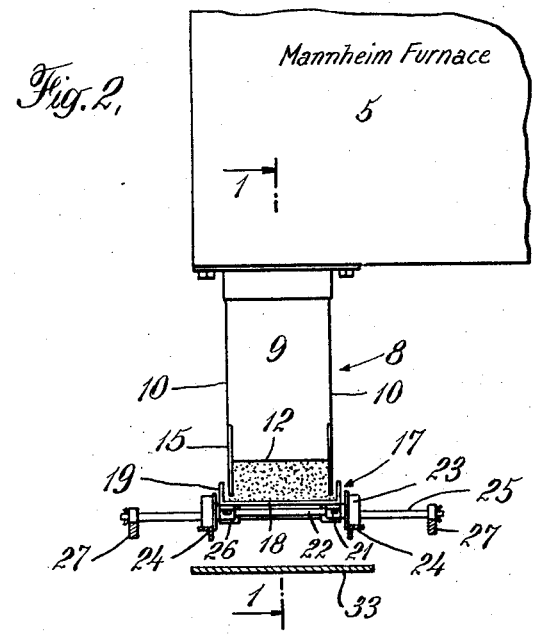
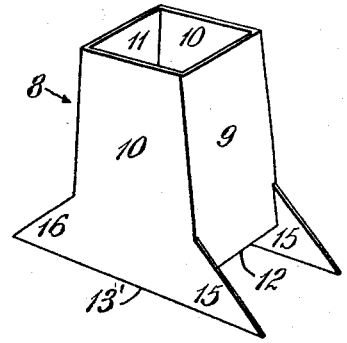
INVENTOR
Michael D. Swords
BY Forbes Silsby
ATTORNEY Patented June 2, 1931

1,807,807

UNITED STATES PATENT OFFICE

MICHAEL D. SWORDS, OF CHICAGO, ILLINOIS, ASSIGNOR TO GENERAL CHEMICAL COMPANY, OF NEW YORK, N. Y., A CORPORATION OF NEW YORK

APPARATUS FOR DISCHARGING SALT CAKE FROM MANNHEIM FURNACES

Application filed January 27, 1928. Serial No. 250,058.

My invention relates to Mannheim furnaces for manufacturing salt cake and hydrochloric acid, and more particularly to a method and apparatus for operating a Mannheim furnace including in combination improved methods and means for discharging the salt cake from such furnaces.

The so-called Mannheim furnace is commonly used in the manufacture of salt cake ($Na_2SO_4$) and hydrochloric acid by the interaction at a high temperature of nitre cake ($NaHSO_4$), which contains sulfuric acid, and common salt ($NaCl$). The hot salt cake product in the muffle of the furnace is propelled by means of rabbles to a discharge conduit leading to a discharge outlet. The usual discharge outlet comprises a trap or gate which normally closes the outlet, and this closure is periodically opened and the salt cake manually raked out into a container. This type of discharging operation is open to considerable objection from a standpoint of working difficulty as well as deleterious effect upon the reaction in the muffle. In its practice considerable manual attention is required to keep the conduit open and prevent overloading of the rabble machinery due to the tendency of the salt cake to compact in the conduit, and considerable quantities of diluting air are admitted into the muffle.

The tendency of the hot Mannheim salt cake to build up accumulations and compact into a solid cake is quite pronounced, and has resulted in the failure of all mechanical methods for removing it.

It has been suggested to use an enclosed discharging mechanism of the screw conveyor type which is sealed to the discharge outlet for co-operation therewith. While more effective sealing of the interior of the furnace from the atmosphere is obtained thereby than is the case in the manual raking operation noted, the other factors which enter into the situation render its use impractical. The effect of the rotating screw action is to increase the caking of the salt cake rather than to reduce it. When the salt cake is subjected to the action of the screw, it cakes to such a degree of hardness that the operation is very difficult and the screw wears out rapidly, principally as a result of erosive action. Moreover, the mass of hot salt cake tends to jam in the discharge conduit at the point of contact with the edge of the screw blade, due to the formation of a rigid crust by the compressive action of the edge of the screw blade, which tends to push the salt cake back into the discharge conduit and compact it.

The object of my invention is to provide an efficient method and apparatus for mechanically discharging the Mannheim salt cake wherein the caking of the material is substantially eliminated and the interior of the furnace is effectively sealed from the atmosphere.

I have experimented with the above described and various other types of discharge mechanism, and have finally discovered that the salt cake can be discharged in uncaked, granular condition in a very simple and efficient manner, while avoiding the introduction of diluting air into the furnace, by proceeding in accordance with the principles hereinafter disclosed.

In the accompanying drawings I have shown a preferred form of mechanism embodying my invention, in which:

Fig. 1 is a sectional view in side elevation of the apparatus embodying my invention.

Fig. 2 is a sectional view in front elevation taken in the direction of the arrows 2—2, Fig. 1.

Fig. 3 is a view in perspective of the hopper from which the salt cake is discharged.

Referring to the drawings, and particularly to Figs. 1 and 2, reference numeral 4 designates a discharge conduit connecting with the muffle of a Mannheim salt cake furnace 5, in which muffle salt cake is produced at a relatively constant rate and by means of mechanical rabbles is continuously directed at a relatively uniform rate toward and into the discharge conduit 4, which conduit terminates at an outlet 6 provided in the wall 7 of said furnace.

An open-ended hopper 8 is secured in any suitable manner to the wall 7 under the outlet 6 and extends downwardly therefrom so that it forms a substantially continuous discharge passage with the conduit 4. Hopper 8 comprises a front wall 9, side walls 10 and a rear wall 11, walls 9 and 11 sloping outwardly from top to bottom, and the bottom rim 12 of said front wall terminates at a point somewhat above the horizontally continuous bottom rims 13 and 13' respectively of the rear and side walls. This spacial arrangement of the portions 12 and 13 of the bottom rim of the hopper provides a baffle-like projection 14 of the rear wall below the bottom rim 12 of the front wall, the purpose of which construction will be made more apparent hereinafter. Spaced guide members 15 and 16, integral with the side walls 10 of the hopper, extend forwardly and rearwardly of the same, respectively as best shown in Figs. 1 and 3.

A discharger comprising a pan 17 is mounted directly beneath the bottom of the hopper for co-operation therewith in a manner which will be more apparent as the description proceeds. This pan 17 comprises a bottom section 18 having a substantially horizontal, plane upper surface, and upwardly extending side walls 19, the whole being of integral construction or composed of several pieces as desired, and said pan is provided with sets of bearings 21 and 21', each set carrying a shaft 22 upon which a pair of rollers 23 is mounted in any well-known manner. These rollers are adapted to travel on a pair of tracks 24, which tracks may be supported in any suitable fashion. A central shaft 25 is secured in suitable bearings 26 provided on the pan 17, and projects beyond the sides of the same as shown in Fig. 2. Spaced driving rods 27 connect the ends of this shaft with a pair of eccentrics, one of which is shown at 28, Fig. 1. These eccentrics are mounted in spaced relation on a shaft 29 for rotation therewith, which shaft may be driven in any suitable manner, as for example, by means of a sprocket-wheel 31, fixedly mounted thereon and connected by means of a roller chain 32, or the like with any suitable source of power.

Below this discharger construction a traveling conveyor 33 is provided traveling in the direction of the arrow for co-operation with the pan in a manner which will hereinafter be made more apparent.

The operation of the apparatus is substantially as follows:

Hot salt cake is fed to the hopper 8 from the discharge conduit 4 leading to the muffle in the Mannheim furnace 5, and this salt cake passes down through the hopper until the bottom 18 of the pan 17 is reached. The position which the column of salt cake normally tends to assume in relation to the hopper and the discharge pan, effectively sealing the discharge opening, is illustrated in Fig. 1.

When the eccentrics 28 are rotated, the action of the driving rods 27 connected therewith will cause the pan 17 to reciprocate back and forth on the tracks 24 transversely of the bottom of the hopper. In Fig. 1 the pan is shown in mid-position. When the pan is moved to the right to its extreme forward position, the frictional engagement of the surface of the bottom 18 of the pan with the bottom surface of the salt cake in the lower part of the column in the hopper will cause a portion of the salt cake to be laterally displaced and carried along with the pan in its forward travel. The exit passage provided by the elevated bottom rim 12 of the hopper wall 9 will facilitate this forward displacement of the salt cake in the lower part of the hopper.

When this bottom portion or layer of salt cake is displaced forwardly by the pan in its forward travel, its place will be filled in by fresh salt cake, and consequently when the pan moves back towards its rearward position an obstruction will be presented by this fresh salt cake backed up by the baffle 14, to the return of the previously displaced salt cake resting in said pan. The result will be that this displaced salt cake will be worked off the pan over the front edge thereof by the rearward movement of the pan relative to the fresh salt cake and the baffle 14. The salt cake will drop onto the conveyor 33 thereunder by which it is carried to storage bins or to other apparatus for further treatment. The purpose of the guides 15 and 16 extending forwardly and rearwardly of the hopper as shown in Fig. 3 is simply to keep the salt cake on the pan within a restricted area and facilitate its displacement onto the traveling conveyor.

The speed of operation of the pan 17 should be so regulated that the salt cake is removed only at such a rate relative to the feeding of the same from the muffle that sufficient salt cake will always be present in the hopper to seal the discharge opening at the bottom thereof. The pan will be in substantially continuous movement, and the discharge of the salt cake, though intermittent, will take place at sufficiently frequent intervals to prevent caking of the column of salt cake, and will be substantially continuous as contrasted with infrequent removal accompanied by intermediate periods of rest of substantial duration.

I have discovered that my method and apparatus for discharging Mannheim salt cake will accomplish the same in a very efficient and unobjectionable manner. I have found that the bottom surface of the column of salt cake adheres to the substantially horizontal surface of the pan with a frictional component of force sufficiently great to cause the lower layer of salt cake in contact with the pan to be laterally displaced upon movement of the pan, while at the same time this adhesiveness of the salt cake is not so great but that the laterally displaced layer will be forced off of the pan upon the return movement thereof without any appreciable tendency to stick to the pan. Hence, by removing the salt cake from the bottom of the hopper by the relatively gentle frictional surface action which characterizes my invention, thus avoiding a compacting action upon the salt cake, and by removing it with such frequency that it does not have time to compact upon standing, the salt cake is freely discharged from the bottom of the hopper in an uncaked, granular form.

It is essential to the efficient operation of my invention that sufficient space be provided intermediate the plane surface of the pan and the bottom of the hopper to permit the removal of adequate amounts of salt cake from the hopper through the exit passage thereby formed. This may be accomplished either by providing a space of appreciable extent between the pan surface and the entire bottom rim, or, as in my preferred embodiment, by providing an appreciable space between the pan surface and only a portion of the bottom rim, e. g. rim portion 12.

By the particular spacial arrangement of the bottom rims 12 and 13 respectively of the front and rear walls of the hopper relative to the surface of the reciprocating pan in the preferred embodiment of my invention herein disclosed, whereby a baffle is formed opposite an extensive exit passage, I obtain a very effective removal. The bottom rims of the structures which lie transversely of the path of travel of the reciprocating pan, e. g. rim 12 and baffle rim 13, are the elements which, in conjunction with the surface of said pan, mainly determine the salt cake exit passage, and by spacing one of these portions (rim 12 of wall 11) an appreciable distance above the reciprocating pan surface along with spacing the opposite portion (rim 13 of baffle 14) in close proximity to said surface I have found that a particularly effective removal results. By reason of the elevated rim 12 an extensive exit passage is provided in the direction of pan discharge which facilitates removal of the salt cake from the hopper, and by reason of the projection of rim 13 of the baffle 14 into close proximity to the pan surface an obstruction is presented which, operating in conjuncton with the fresh salt cake which has replaced that removed, serves to oppose the return of the removed salt cake and causes it to be pushed off the pan.

Moreover, the arrangement and the action is such that at all times during the operation there will be an effective sealing of the discharge opening by the salt cake, thus avoiding the possibility of air being admitted into the furnace. In the preferred manner of operation, a uniform amount of salt cake is continually maintained in the hopper by regulating the rate of discharge therefrom to conform to the relatively constant rate of production of salt cake in the muffle and the relatively uniform rate of its delivery into the discharge passage. If, however, the supply of the salt cake to the hopper should be arrested for any reason, the exit passage provided by the elevated edge 12 and the pan surface will nevertheless be substantially blocked by the last remaining portion of salt cake from the hopper. This portion of salt cake will remain undischarged from the reciprocating pan, effectively sealing the opening, until the supply of salt cake to the hopper is renewed, whereupon fresh salt cake will come down between the baffle 14 and the portion of salt cake on the reciprocating pan and will cause it to be pushed off onto the conveyor.

The substantially vertical enclosure provided by the hopper maintains the column of salt cake therewithin at an angle greater than its angle of repose, and consequently the effect of gravity will be sufficient to constantly feed the salt cake to the pan. While the enclosure is shown as vertical, it is obvious that it may be inclined therefrom as long as a sufficient marginal angle is provided over the angle of repose of the column of salt cake therewithin to assure a downward movement of the same. The downward and outward inclination of the hopper confines is of advantage over the downward and inward inclination of ordinary hopper constructions in that less compacting pressure will be brought to bear upon the salt cake in the lower part of the hopper.

While I have found the form of discharger disclosed herein to be particularly advantageous, it should be understood that my invention is not confined to the use of the particular structure shown, but that other types and arrangements of parts falling within the scope of the appended claims are applicable.

I claim as my invention:

1. The combination comprising a Mannheim furnace, a stationary hopper for receiving salt cake from the furnace, said hopper being positioned substantially vertically and forming a straight unobstructed passageway, a movable discharger positioned beneath said hopper and engaging the lower surface of a column of salt cake in the hopper to seal the hopper against access of air to the furnace, the lower rim of said hopper being spaced a short distance from the discharger on three sides thereof to allow clearance between the hopper and discharger, one side of the hopper in the direction of movement of the discharger being spaced from the surface thereof a sufficient distance to allow salt cake to be removed from the hopper, and means for moving the discharger in contact with the lower portion of the mass of salt cake to remove salt cake from the hopper by frictional contact therewith at a rate not exceeding the rate at which salt cake from the furnace is received by the hopper.

2. The combination comprising a Mannheim furnace, a stationary hopper for receiving salt cake from the furnace, said hopper being positioned substantially vertically and forming a straight unobstructed passageway, a reciprocating discharger having a plane surface positioned substantially vertically and supporting a column of salt cake in said hopper to seal the hopper against access of air to the furnace, the lower rim of said hopper being spaced a short distance from the discharger on three sides thereof to allow clearance between the hopper and discharger, one side of the hopper in the direction of reciprocation of the discharger being spaced from the surface thereof a sufficient distance to allow salt cake to be removed from the hopper, and means for reciprocating the discharger in contact with the lower portion of the mass of salt cake to remove salt cake from the hopper by frictional contact therewith at a rate not exceeding the rate at which salt cake from the furnace is received by the hopper.

3. The combination comprising a Mannheim furnace for the manufacture of salt cake and hydrochloric acid, a stationary hopper secured to the furnace and positioned substantially vertically for receiving salt cake from the furnace, a discharger mounted for reciprocation beneath the hopper and provided with a substantially horizontal surface having lateral retaining portions, the ends of the discharger being unobstructed to allow free movement of the salt cake in the direction of reciprocation of the discharger, the lower rim of said hopper being spaced a short distance from the discharger on three sides thereof to allow clearance between the hopper and discharger, one side of the hopper in the direction of reciprocation of the discharger being spaced from the surface thereof a sufficient distance to allow salt cake to be removed from the hopper at a rate not exceeding the rate at which salt cake from the furnace is received by said hopper and means for reciprocating the discharger in contact with the lower face of the salt cake to remove salt cake from the hopper by frictional contact therewith.

In testimony whereof, I affix my signature.

MICHAEL D. SWORDS.